May 10, 1938.  H. KARL  2,116,604
SAFETY DEVICE FOR MOTOR VEHICLES
Filed April 9, 1935  3 Sheets-Sheet 2
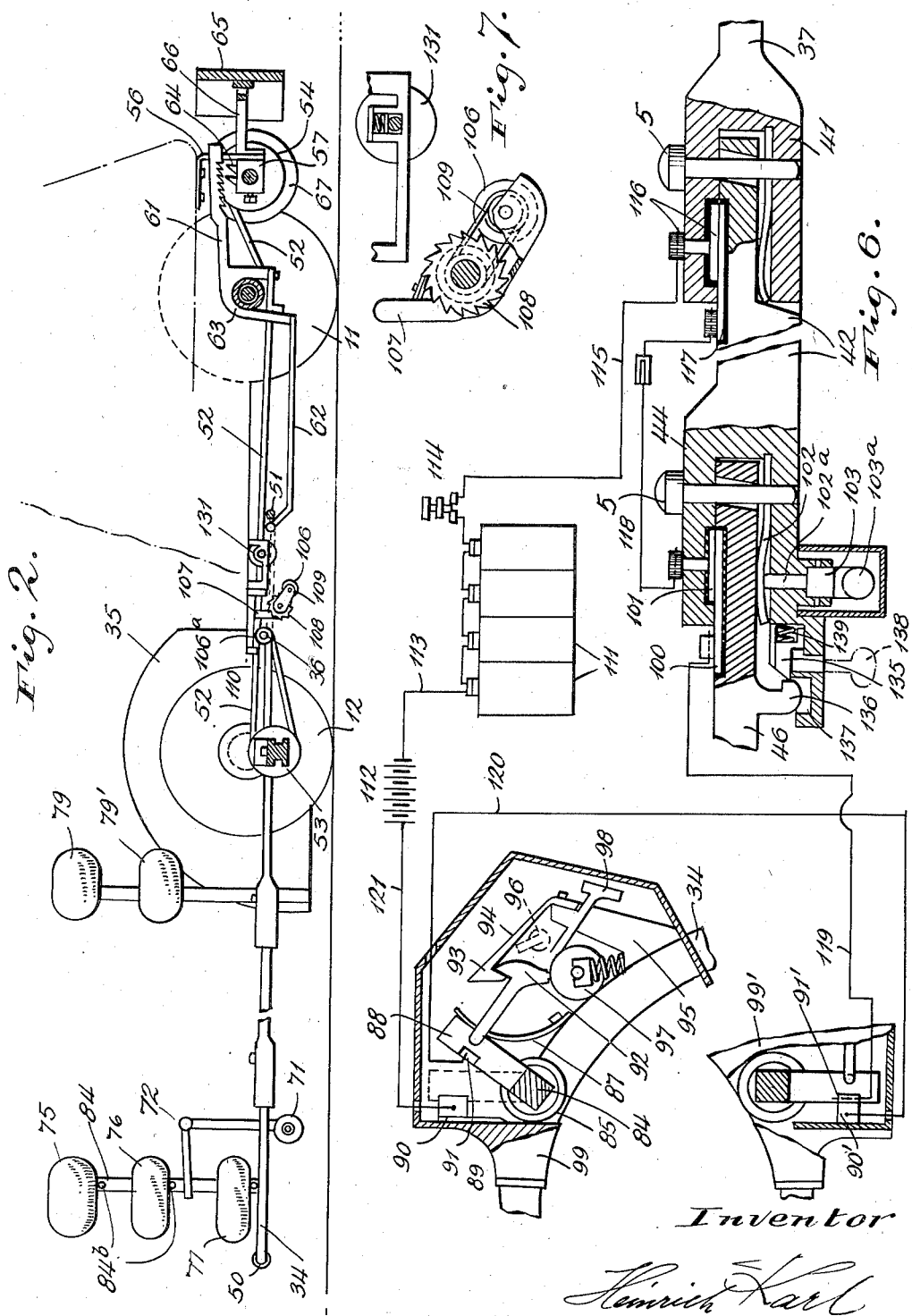
Inventor
Heinrich Karl

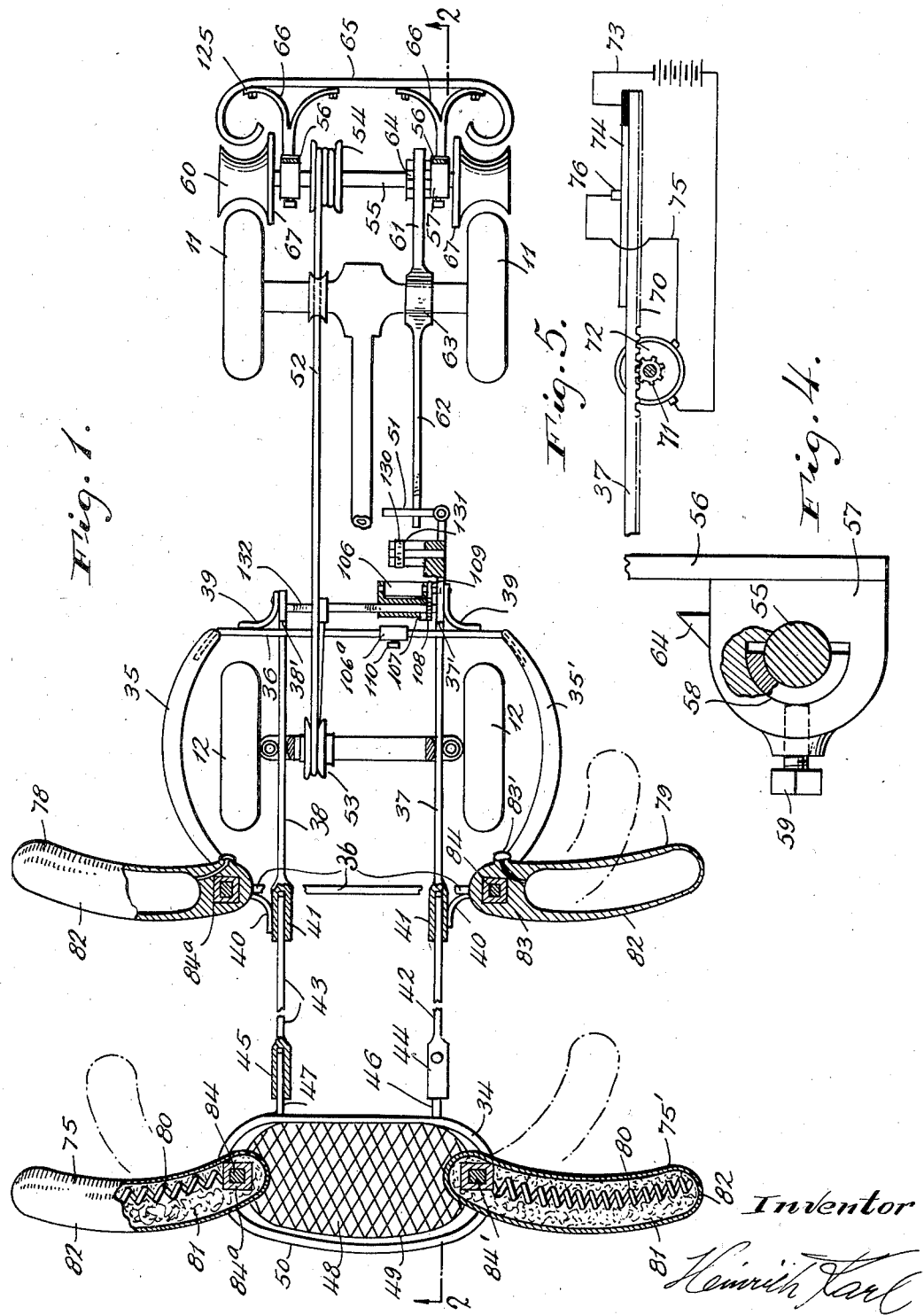

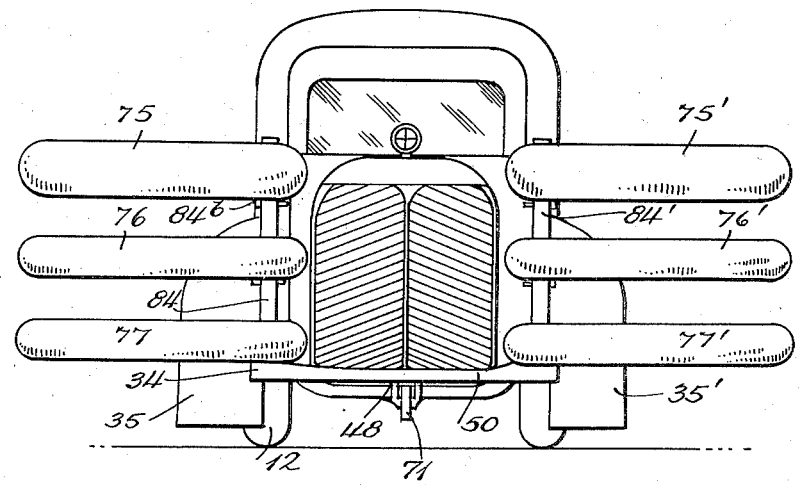
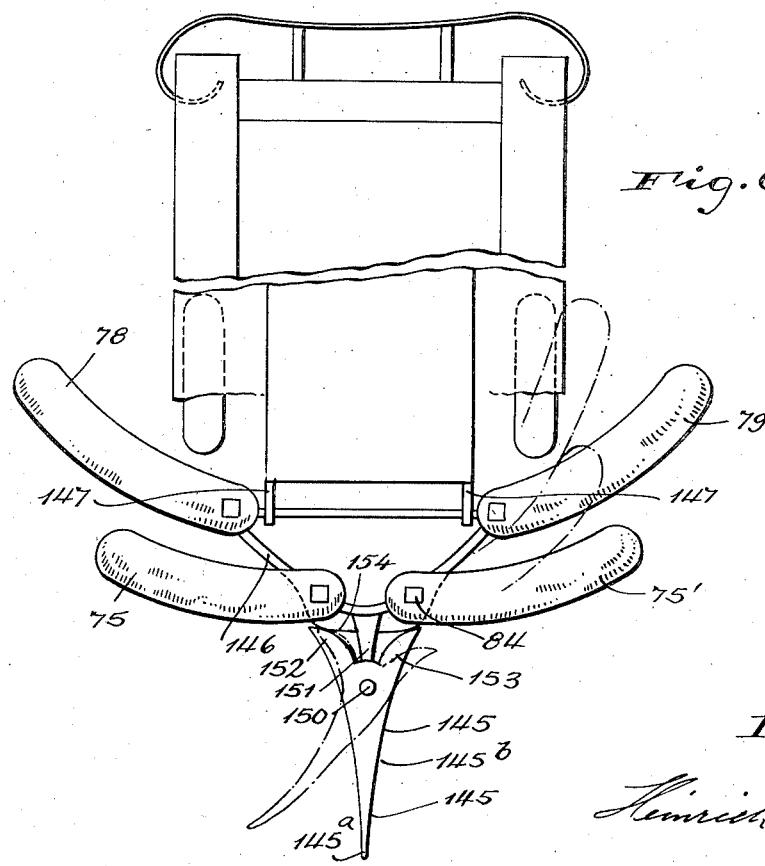

Patented May 10, 1938

2,116,604

UNITED STATES PATENT OFFICE 2,116,604

SAFETY DEVICE FOR MOTOR VEHICLES

Heinrich Karl, Jersey City, N. J.

Application April 9, 1935, Serial No. 15,367

16 Claims. (Cl. 180—83)

This invention relates to improvements in safety devices on motor vehicles and has as its main purpose first, the protection of the occupant of that automobile or truck and the prevention of the automobile or truck from being damaged or destroyed when it collides with another vehicle or with a rigid obstacle, such as a wall, a tree-trunk etc., whereby a recoilable and automatically restorable front bumper and side fenders and a specially constructed rear bumper with associated parts are devised for chiefly achieving this purpose whereby especially the front bumper not being dependent upon springs for its restoration to normal position, is adapted to recoil considerably further than such fenders or bumpers that depend upon springs for their restoration to normal position, and secondly such safety devices are associated therewith that will prevent the pedestrian (adult or child) that should happen to be in the path of the vehicle from being run over and being killed or injured. The secondly mentioned improvements consist in part of a readily spread out net or mat on which the pedestrian will fall and then sit or lay, who happens to be too near to the center line of the path of the automobile that strikes him. The secondly mentioned improvements include also such additional means (bendable padded arms etc.), that are adapted to softly but energetically push the pedestrian out of the path of the vehicle should that pedestrian not be near enough to the center line of the path of movement of the vehicle in which event the pedestrian would not fall upon said net but would rather be struck or brushed by the side fender or other structure of the vehicle and consequently thrown off his feet whereby he would suffer a broken skull or other injuries if the automobile or truck was not equipped with said additional means.

A further object of the invention is to create such means that serve for stopping automatically but only temporarily the vehicle should it collide heavily with another vehicle or other obstacle, and a further object of the invention is the creation of means for automatically halting the vehicle until unlocking means permit again its progress should a pedestrian be struck heavily by the vehicle. A still further object of the invention consists in creating means for recording the collisions for vindicating or accusing the driver according to the degree of violence of the collisions and the direction and circumstance in which they occurred.

Part of the present invention forms a simplified modification of some of the inventive matter shown in my co-pending patent application Serial No. 640,183 that was filed Oct. 29, 1932 and in which division was required by the Patent Office. Likewise division was also required in the present application between the specific claims upon some of said additional means and those that are drawn upon the remainder of the invention, but the specific structure of these additional means which refer to said bendable padded arms etc., and the parts in strict cooperation therewith will be claimed in a special patent application.

The detail features will appear as the description progresses.

In the accompanying drawings which form part of the specification

Figure 1 represents a top- or plan-view of the invention in general, applied to the modern automobile, whereby the vehicle body and the elements that propel the vehicle are left away;

Figure 2 is an elevational view on the line 2—2 of Figure 1.

Figure 3 is a front view of the vehicle showing the front fender or bumper with associated parts such as the resilient and bendable arms.

Figure 4 is a sectional view of a detail;

Figure 5 is a diagrammatic view of a modification showing electrical means associated with the brake mechanism and utilized to control the restoration of bumper or fender elements to their normal positions after striking an obstruction.

Figure 6 shows the scheme for opening the circuit that serves for igniting the charges in the motor when a collision with a person takes place; the details on the left are seen from above and are additional to said arms employed in front of the vehicle and partly serve for automatically stopping the vehicle and for recording collisions, while those details shown on the right are in elevation, partly in section and show automatic stopping and recording means in connection with the parts that hold the front bumper.

Figure 7 shows a detail of one of the modifications of a recording device.

Figure 8 is a top view of an arrangement of the bendable arms when employed as the only safety device on the motor vehicle for protecting the pedestrian.

Automatic means for accomplishing the aforesaid purpose and the operation of the brake mechanism is shown in Figures 1 and 2. This means comprises a front bumper 34 disposable at various distances in advance of the front wheels 12 and arranged to contact any obstacle in the path of the vehicle. Side fenders 35, 35' connected by bars 36 are supported in any suitable manner in operative position relative to the wheels 12 so as to strike any obstruction on either side of the vehicle, and both the fenders 35, 35' and the bumper 34 are adapted to be moved rearwardly under the influence of impact thereof with any obstruction. The bumper 34 may be directly connected to rearwardly extending rods 37 and 38 which pass underneath the bars 36 and carry springs 39 and abutments 37', 38' which engage the rear bar 36 so that when either fender 35 hits an obstruction on its front and side a rearward movement will be imparted to said rods 37, 38. Springs 40 carried by the front bar 36 engage the last-named rods so as to aid in normally centering the fenders 35, 35' with respect to said rods. The side-fenders 35, 35' and the parts connected thereto as, for instance, the bars 36 or the springs 40 not being fastened to the rods 37, 38, permit the latter together with their front bumper 34 to recoil a considerable longer distance than the side fenders 35, 35' if said rods 37, 38 are extended far enough to the front.

Between the rods 37, 38 and the bumper 34 there may be extension rods 42, 43 arranged and insertable for advancing the front bumper 34 considerably. The rods 37, 38 are provided with scabbards 41 at their foremost ends into which may be inserted the rear ends of the extension rods 42, 43 which may have the length of several yards. The front ends of these extension rods 42, 43 are also formed as scabbards 44, 45 into which the extensions 46, 47 of the bumper frame 34 will be inserted and secured with pins 5 that pass through holes in the scabbards and in the extensions. The same applies also to the scabbards 41 and extension rods 42, 43. The bumper frame 34 may be covered with a net or mat or any suitable means 48 that will soften the fall of a person that has been struck by the vehicle, that is by the front edge of the frame 34 and who consequently falls upon the net or the like covering 48. The front edge 49 of that frame is to be padded in such way that no person will be hurt that is struck by that edge and it is even proposed to add a pneumatic hose 50 in front of the metallic etc. rounded front edge of the frame 34. When the automobile is to be used in crowded parts of a large city the extension bars 42, 43 may be left away and only the frame 34 placed in front of the vehicle by inserting the extensions 46, 47 into the respective scabbards 41 of the rods 37, 38. The extensions 42, 43 may be added for advancing the front bumper or frame 34 a considerable distance because the more the frame 34 is distanced from the vehicle itself the less is the danger for the latter to be smashed in a collision with a stable structure or tree etc., because the bumper or frame 34 has then a sufficient long distance to recoil together with the rods 42, 43, 37 and 38. At the same time there will be a braking action on the vehicle as will be pointed out subsequently. At their rear ends the rods 37, 38 are connected by a bent cross bar 132 to which a flexible member, such as a rope 52 is secured. This rope 52 is led around a pulley 53 revolvably mounted on or near the front axle of the vehicle as seen in Figure 1 or it may be mounted in hangers secured on the underside of the car or truck body.

The means provided for braking the vehicle and for restoring the rods 37, 38, 42, 43 and the bumper 34 to their normal positions when the engine is started after having come to a stop upon the application of the brake mechanism are as follows: As shown in Figures 1 and 2 this means comprises the rope or flexible element 52 which is wound upon a pulley 54 that is mounted upon a shaft 55. This shaft is suspended in the lower ends of flexible hangers 56 and in the enlargement 57 (Figure 4) of each hanger through which the shaft 55 passes there is disposed an arcuate brake shoe 58 the pressure of which against the shaft 55 may be regulated by a set-screw 59. The shoes 58 are designed to prevent the too free turning movement of said shaft in its bearings when a forward pull is exerted upon the flexible element 52 by the movement of the rods 37, 38 just described. This pull upon the element 52 which has a tendency to rotate the drum 54 and consequently the shaft 55 is overcome by the drag upon said shaft created by the shoes 58 and as a consequence the entire shaft is pulled slightly forward, the hangers 56 being sufficiently flexible to permit this movement. When the shaft 55 is thus moved, rollers 60 mounted upon the extremities of said shaft 55 come in contact with the walls (tires) 11 and provide braking means therefor. However, the primary reason of the engagement of the rollers 60 with the walls 11 is to prepare for the restoration of the rods 37, 38 and the frame 34 etc. to their normal positions when the wheels 11 are again rotated by the starting of the engine. When this is done as previously described, the wheels 11 will rotate the rollers 60 and consequently the shaft 55, the driving power of said wheels being then sufficient to overcome the braking action of the shoes 58 on said shaft. This rotation of the shaft in a clockwise direction, as viewed in Figure 2, will, through the flexible connection 52, exert a forward pull upon the bent cross bar 132 thereby causing the rods 37, 38 to be moved forwardly. As this is accomplished the resiliency of the hangers 56 supporting the shaft 55 will become effective to restore said shaft to its normal position. For holding the rollers 60 securely against the tires 11 at least until the frame 34, rods 42, 43 and 37, 38 are again moved forward to their normal positions, an additional means is employed consisting of the arms 61, 62 that have a common middle part 63 that surrounds the axle housing and balances on same. Arm 61 is made heavier than arm 62 and on the lower side it is provided with teeth that are adapted to engage with a tooth 64 or several of them (Figure 4) formed on an extension of the frame or enlargement 57 that holds the shaft 55. Arm 62 has its outer free end bent up and the top part of this bent up end is engaged by the lower part of the inwardly extended arm 51 of rod 37 when the latter is in its normal forward position. Arm 62 is thereby pushed down somewhat thus forcing arm 61 to be out of engagement with the tooth or teeth 64. When the arm 51 is being pushed backwards arm 62 comes out of engagement with it and arm 61 drops upon the tooth 64 thus holding the rollers 60 firmly in engagement with the tires 11 until the front bumper is restored to its normal advanced position by the rope 52, crossbar 132 and rods 37, 38 etc. as previously explained whereby arm 51 comes into contact with the upwardly bent end of arm 62 and thereby moves arm 62 down disengaging arm 61 from the tooth or teeth 64 whereby the flexible hangers 56 will move the rollers 60 away from the tires 11.

In Figure 5, electrical means are shown for accomplishing the restoration of the rods 37, 38 and bumper 34 to their normal positions after being actuated to apply the brakes of the vehicle. In this form the rod 37 is provided on its undersurface with a rack 70 engaged by a gear 71 mounted upon the shaft of an electric motor 72 that is suitably secured to the underside of the vehicle body or to the chassis. The circuit for this motor includes a conductor 73 normally engaged with the insulated end of a contact strip 74 carried by said rod, and a second conductor 75 connected to a terminal 76 which engages the conducting portion of such contact strip 74. Thus it will be seen that when the rod 37 is forced rearwardly the contact at the end of the conductor 73 engaging said insulated portion of the strip 74 will move therefrom into engagement with the conducting portion and a circuit will be closed for the motor 72 so that the same will become effective to rotate the gear 71 in the proper direction to restore the rod 37 to its normal position. The pull exerted by the electric motor 72 in moving the rack 70, rods 37, 38 and the front bumper forward creates also the resistance that must be offered to a certain degree by the front bumper at the occurrence of a collision. This circuit may be designed as to form circuit connections that are comprised in the circuit that serves at the same time for the ignition of the charges in the motors.

So far the means have been explained that prevent damage to the vehicle and now those means will be emphasized that serve for the protection of the pedestrian.

If the pedestrian will be in the vehicle's path and more particularly in the path of the bumper or frame 34 and suppose that the vehicle moves sufficiently fast that pedestrian will by all probability fall upon the net or mat 48 and through that will be safe from being run over by the wheels of the vehicle. In falling upon that net 48 the weight of that person will press the frame 34 down somewhat until the wheel 71 mounted underneath the frame 34 touches the ground. For the convenience of the pedestrian there may be a back 72 on which he can also hold himself fast. For preventing the pedestrian from being hurt when the front edge of the frame strikes him which supposedly would be directed against his legs this edge should be padded or there should be a pneumatic hose 50 provided for and held in front of the frame edge.

If a pedestrian should be still in the path of the bumper frame 34 but not sufficiently towards the center of it or if he should be already out of that path but still in the path of the vehicle it will be problematical if he will fall upon the net 48 or if he will fall outside of the frame 34 but still in the path of one of the wheels 12 or other parts of the vehicle. In this instance it is the best to simply shove off the pedestrian in such manner that he gets out of the path of the entire vehicle. For accomplishing this there are resilient arms 75, 75', 76, 76', 77, 77' so arranged on the automobile etc. on both the left and right sides thereof that they reach laterally even a certain distance outside the limit of the vehicle or other structure. These arms may be constituted in various ways but should not hurt the pedestrian and consequently should be of a certain softness. Such arms may be arranged also on the side bumpers or fenders 35, 35' as shown in Figures 1 and 2. All of these arms or only some may be of a pneumatic character with the well known screwed on caps 83' etc. as shown by those arms indicated by 78, 79, but it is of greater simplicity for the automobile operator to have the arms each provided with a sufficiently strong spring 80 and the remainder of the sausage shaped arms 75, 76, 77, 75', 76', 77' and also 78, 79, 78', 79' filled out with cotton or other padding material 81 whereby especially the front part should receive the bulk of it. That is to say that the spring 80 should be arranged in the rearward part. The outer envelope 82 may be of rubber inside and of leather outside and it may be inflated with air as those indicated by 78 and 79, or the outer envelope may be made of leather only and sewn together at the rear part of the arm. If the arm envelope is made of rubber and the arm inflated with air there must be a solid part 83 that surrounds the upright directed partly angularly formed rod 84. The rod 84 is secured to the front bumper 34 or fender 35 in such manner that it cannot be bent. All these so far described arms are provided with an angularly shaped metallic piece 84ᵃ that has a hole that fits upon the angular part of the rod 84. Each arm may therefore be withdrawn at any time from or placed on the rod 84 and pins 84ᵇ must be inserted in the rod 84, one underneath each arm for preventing the sliding down of the arms (see Figure 2). If an automatic control and the recording of collisions with the arms is to take place the rod 84 then should be inserted in a seat that permits the revolving of that rod. A relatively strong spring 87 (see Figure 6) is secured to the frame and presses with its free end against an extension 88 on the rod 84 whereby that extension is pressed against an abutment 89 that carries an electric contact 90. On the extension 88 there is also an electric contact 91 provided for contacting with the contact 90 when the arm 84 is partly revolved through a person or other obstacle that might have been struck by the arms 75, 76 and 77 that are secured to the rod 84. Both electric contacts belong to a circuit that will be traced later. An arrangement might be made to automatically hold the rod 84 in the position in which it will not bring the contact 91 into electrical contact with the contact 90. This is simply accomplished by a hook 92 secured on the extension 88. This hook 92 hooks itself fast on another hook 93 that forms the forward end of a springy metal part 94 that is secured to an extension 95 on the frame 34. The hook 92 will snap on hook 93 only when the extension 88 has been turned so far away from the abutment 89 that it indicates a heavy collision with a person etc. A slight collision will allow the spring 87 to move back the extension 88 against the abutment 89 but arrangements may be made to prevent the spring 87 from moving the extension 88 against the abutment 89 and consequently prevent the revolving of the rod 84 into its normal position by simply adequately elongating the springy part 94. These simple mechanisms may be enclosed in a housing and the hook 93 on the springy part 94 should be disconnectable from the hook 92 only by the insertion of a key 96 which is shown in section and which when turned in the direction in which the cam will move the springy part 94 away from the hook 92 the latter will be released from the hook 93 and the spring 87 will move the extension 88 together with the rod 85 to their normal positions in which the contacts 90, 91 contact with each other. The key 96 should be carried only by persons such as policemen, that are entitled to check upon the drivers of automobiles or trucks. There might be a further step by creating a recording means that however, does not exclusively serve for checking upon the drivers of automobiles or trucks, as will be explained later and that consists of a roll of paper 97 so inserted in a receptacle provided for in the extension 95 that the hook 92 or a part connected thereto will make a punch on the strip of paper everytime it will be pushed to interlock itself with the hook 93. The hook 92 thereby pushes the strip of paper a little distance further and thereby revolves the whole roll also a little whereby a space will be left on the strip for the next following punching should another move of the hook 92 occur against the roll 97 that means another collision with a person or with another object as with a vehicle etc. In order to prevent the strip of the roll 97 from moving back again everytime the hook 92 will be disconnected from hook 93 the loose end of the strip may be passed through a slot in the casing wall and a little weight or seal 98 may be attached to that loose end and be left hanging. A cover 99 (only partly seen) should cover the mechanism above described and should be secured with a lock that could be opened only by persons that have the key and authority for doing it. So far the mechanisms have been described that are in connection with the arms 75, 76, 77 and in connection with the arms 75', 76' and 77'; similar mechanisms are employed and arranged to suit the particular movements which these arms will make in case of a collision with a person or some moving or stable objects. The electric contact that would be equivalent with the contact 90 is enumerated 90' and that which is equivalent with contact 91 is indicated by 91'; they are shown only in the diagram of Figure 6 whereby the other mechanisms in connection therewith are not shown but only part of the cover 99 thereof.

In the case where a person collides with that automobile, etc., and falls upon the net 48 on the bumper 34 there should also follow an automatic stopping of the vehicle and for making the invention complete there should also be a control upon such accidents that might check upon the driver or that will vindicate him as will be explained later.

In connection with the bumper frame 34 there is an electric contact 100 so arranged on top of the part 46 (or 47) that it will contact with another electric contact 101 on the scabbard 44 (or 45 respectively) when the bumper frame 34 is not pressed down so much that these two contacts become disconnected from each other. Such disconnection will happen when a person falls upon the net or mat 48 when it has been struck by the bumper front part 50.

For avoiding the bumper 34 and the other parts in connection therewith to prevent a disconnection of the two contacts 100, 101 through their weight, there is a strong spring 102 so arranged inside the scabbard 44 or 45, that is, bent in such fashion that it will press the part 46 (or 45) upward and consequently cause also the contacts 100 and 101 to contact with each other. An additional weight, however, of approximately 30 or more pounds will cause the spring 102 to yield and press the part 46 downward disconnecting contact 100 from contact 101.

There might as well be a strip of paper 103 rolled up and so adjusted that through a punching point 102A fastened to the spring 102 a puncture upon that strip occurs every time the spring 102 is pressed down, as, for instance, when a person falls upon the net or mat 48. Similarly to the strip of paper or roll 97 there should be a weighted seal 103A provided for and secured to the loose end of the strip of paper and left hanging so that the strip will not be pulled back when the spring together with the punching point goes up again if for instance when the person that fell upon the mat or net 48 leaves it or is taken off.

The control devices in connection with the safety devices on the automobile or truck are not exclusively intended to check upon the driver of the automobile, etc., but to the contrary they are means for vindicating the driver before the authorities, because a non-punched strip will prove the guiltlessness of the driver in case of an accident or a weak punch will prove that the driver was not driving his truck or automobile too fast and that it was the pedestrian that was to blame chiefly. A weak punch will occur when the pedestrian is not vehemently struck by the arms 75, 75', etc., or if that pedestrian does not fall upon the net or mat 48 but simply touches it with his legs or presses it down with his hands.

In order to distinguish a collision, also a side-collision, between a pedestrian and one between an object that gives more resistance, as for instance a tree trunk, etc., there is also a rolled up paper strip 106 arranged and inserted in a receptacle (see Figures 1, 2 and 7) and so positioned that it will contact with the flange 130 of a wheel 131 which has formed on its circumference a number of types or other elevations that are adapted to make impressions on the paper strip rolled up on the roll 106 (see Figures 2 and 7) when the rod 132 that bridges the rods 37, 38 is moved backwards on account of a collision of the bumper 34 or of the side fender 35 or 35' with some resistance offering object. On the receptacle for the paper roll 106 there is a lever 107 secured and pivoted to the rod 132 and arranged in such manner that when it strikes the lower part of the hanger of the wheel 131 it will be turned to the left on its pivot which is formed by a part of the rod 132 and thus moves that part of the receptacle that holds the roll 106 upwards whereby the latter is then brought into contact with the flange 130 of the wheel 131 that makes the impression upon it. When the rods 37, 38 together with the bumper 34 and the rods 132, 36 are moved forward again to their normal positions the lever 107 will strike again the underside of the hanger of the wheel 131 but will be turned to the right on its pivot and consequently will lower the receptacle that holds the paper roll 106 whereby the latter will not come into contact with the flange 130 of the wheel which prevents a second punching or imprinting on the same place on the paper strip on which the impression has been made already. In order to turn the roll 106 somewhat so that a free space on the paper strip is offered for the next impression or punching there is a ratchet wheel 108 arranged and mounted on a rounded portion of the rod 132. An extension of that ratchet wheel is formed as a pulley and an endless belt is laid on same and is also laid around a pulley 109 that forms an extension of the shaft on which the paper strip 106 is rolled up. On the lever 107 there is an extension secured that is of a springy character or that is provided with a spring and which presses it downward whereby it engages a tooth on the ratchet wheel every time in which this lever is pushed to the right by the lower part of the hanger of the wheel 131. It follows then, that when only a slight collision occurs the lever 107 being not pushed to the right but only to the left, imprints or punches will be made on almost or directly the same place on the paper strip because the roll 106 will not be revolved sufficiently. This is another means for recording either in favor or against the driver in case of accidents. The paper roll 106 is made sufficiently broad so that in case of a side collision in which the side fenders would be moved either to the left or to the right and consequently also that roll together with the other mechanisms mounted on the rod 131 will together with the latter be moved somewhat laterally and rearwardly will still receive impressions or punches from the flange 130 of the wheel 131. It will be noted that whenever the side fenders 35, 35' will be pushed from the rear towards the wheels 12, as, for instance, by another vehicle the rods 36 and 132 would be moved forward and the fender would find an absorption of the shock when pressed against the tire of the wheel 12. In this instance there will be a punching or imprint made on another paper strip indicated by 106A that records such happening. For this purpose there is a somewhat resiliently arranged imprinting device 110 secured on the underside of the car body and right in front of the paper roll 106A and it reaches far enough down so that whenever that roll 106A moves forward together with the rod 36, etc., it will receive an impression (or punching) by that downwardly directed means 110. The shape or type of the impressions should differ from those made by the flange 130 of the wheel 131.

From the foregoing it will be seen that a complete recording is made by the means described so far. In the most grave collisions, and this refers especially to collisions with pedestrians in which the pedestrian either falls upon the net or mat 48 or is shoved out of the path of the vehicle by means of the arms 75, 76, 77, 75', 76', 77' etc. there should be an automatic stopping of the vehicle without the driver being able to drive the automobile or truck away from the scene of the accident. In this instance it is contemplated to simply interrupt the circuit that serves for electrically igniting the charges in the cylinders of the motor. This circuit is illustrated in Figure 6 and it shows that all the electric contacts so far mentioned are included in that circuit. It follows therefore that whenever some contacts become separated that normally have to contact with each other there will occur no ignition in the cylinders and consequently the automobile or truck will be unable to flee the scene of the accident. It will be noted from the foregoing description that there will not be an automatic stopping if the collision occurred with some other objects but not with a person unless that other object pushes the arms 75, 76, 77, 75', 76' or 77' back or if it pushes the front bumper 34 down which in most cases is not likely to occur because stable structures or hindrances as posts, tree trunks etc. would simply cause the bumper 34 to recoil without pushing it down when that bumper collides with such rigid obstacle.

The electric circuit that serves for the ignition of the charges in the cylinders of the motor 111 and for automatically halting the automobile or truck when a pedestrian is struck heavily includes the battery 112, the wire 113, the sparkplugs in the motor 111, the switch 114 at the driver's seat, the wire 115, the contact 116 (this contact together with contact 117 has not been mentioned before, but they are similarly arranged as the contacts 100 and 101, respectively and the contact 116 will replace the contact 101 if the extension 42 should not be used whereby the front bumper 34 and its extension 46, respectively, will be directly connected to the scabbard 41 which is similarly constructed as the scabbard 44 described previously) wire 118 and contact 101 if the extension 42 is used, contact 100, wire 119, contact 91', contact 90', wire 120, contact 91, contact 90, wire 121 and negative side of battery 112.

There is also a rear bumper 65 formed of a sheet of metal of certain thickness which has convolutely shaped, turned-in ends of a springy character and which conform with the curvature of the rubber rollers 60. This rear bumper 65 has pins 125 that are adapted to be held by and slide in slots of the springy holders 66 that are bifurcated and which are secured to the hangers 56. The rollers 60 are provided on their interior sides with disk-like parts 67. In case of a collision, as, by a vehicle pressing against the rear bumper 65 the convolute ends thereof will press against the rollers 60 which again will be pressed against the tires 11 whereby the shock caused by the collision will be greatly absorbed. If that collision should come partly from the side that is against one of the rounded ends of the bumper 65 that end will press against the disk 67 and since this rounded end part is of a springy character it will absorb the shock caused by the collision.

In its operation the front-bumper if colliding with a rigid object causes, when recoiling, the flexible member 52 to pull the rubber rollers 60 against the tires 11 which brakes them, whereby the lever 61 drops holding then the rollers 60 firmly against the tires 11. While the vehicle moves backwards away from the obstacle with which it collided the flexible member 52 will be slackened because the rollers 60 will then be turned in the direction that causes that slackening. After the starting of the vehicle in the forward direction, however, the rollers 60 are turned in the direction in which the pulley 54 will wind up again the flexible member 52 whereby the rods 51, 37, 38 and the front bumper 34 are moved forward. Having arrived at their furthermost advanced position lever 62 will be pressed down by the rod 51 thus releasing arm 61 from the tooth 64 and allowing the springy hangers 56 to move the rollers 60 away from the tires 11. The recording strip 106 thus receives the imprint made by the wheel 131. In a collision with a person, that person may, either fall upon the net or mat 48 causing an interruption in the circuit that normally ignites the charges in the motor, thus stopping the vehicle automatically and causing the recording of that accident, or the person, being too far outside the path of the net 48 but still in danger from colliding with other parts of the vehicle, will collide with the soft arms 75, 76, 77 or 75', 76', 77' and if that collision is only a slight one the respective arms will simply bend back chiefly with their free ends in a rearward direction and while the vehicle still advances will shove that pedestrian out of the way of the vehicle. If the impact is a heavy one due to the great speed of the vehicle the arms 75 etc. will be bent further causing a partial revolution of the rod 84 and the interlocking of the hooks 92, 93 whereby the interruption of the circuit for the motor and thus the automatic stopping of the vehicle is obtained and also the recording of that accident on the paper roll 97. The additional arms 78, 78', 79, 79' serve for preventing the pedestrian that collided with some of the other arms from falling back again into the path of the vehicle. The electrically performed advancing of the front bumper etc. as shown in Fig. 5 permits also the recording of collisions. There may as well be means employed for automatically stopping the vehicle until an authorized person arrives with the special key that releases again the front bumper and permits the circuit for the ignition of the charges in the motor to be closed again. Such interlocking device is shown in Fig. 6 and consists of the bolt 135 that interlocks with the hook 136 when the latter enters the recess 137 when spring 102 is pushed down. The key 138 pushes the bolt back against the pressure of the spring 139 and thereby releases the hook 136.

I have shown herewith a complete system for safeguarding not only the passengers of an automobile but the automobile itself and also the pedestrians that are in danger of being run over, and have added means that simplify the proceedings in finding out the guilt in case of accidents, and it is obvious that automobiles or trucks may simply be equipped with the arms 75 etc. with or without automatic control of the vehicle and with or without recording means and one may employ only the recoilable front bumper and side fenders either with or without automatic control of the vehicle and with or without recording means. An example of such arrangement is shown in Figure 8 in which only the arms 75 etc. are employed as the safety means for the pedestrian.

There is a nose 145 arranged as the foremost part and made of bendable relatively soft rubber which when striking a person bends towards the side, right or left, whichever offers the lesser resistance. It happens therefor that the person colliding with that motor vehicle in the center line of the path of the vehicle will reach the next arm 75 or 75' behind that nose but on the side thereof towards which the nose was not bent and will be shoved out of the way of the vehicle by successively coming also into contact with the other next rear arm or arms. This is best explained by referring to parts of the illustrating Figure 8 in which the nose 145 when supposedly bent to the left after a collision with a person lets that person slide along its right rearwardly inclined wall 145ᵇ and along the front of the arm 75' and also along a part of the front of the arm 79 whereafter that person will be out of the path of the vehicle. The rubber nose 145 successively becomes thicker towards its rear part and straightens itself out after every collision.

The arrangement of the several arms and the nose requires a triangularly shaped frame 146 to which the vertical rods 84 are secured. The frame 146 that may have an upper and a lower part for better holding the rods 84, is secured to the automobile body or chassis by means of bands 147. The nose 145 extends from the lower part of the frame 146 to a height that equals the position of the uppermost arms 75 etc. and forms therefore a vertically directed frontal edge 145ᵃ. The rods 84 and the arms 75 etc. are of the same construction as those shown and described in connection with Figures 1, 2 and 3. It is to be noted that the person that collides with the arms 75' and 79 will be moved out of the path of the vehicle along the outer dotted lines shown in Figure 8 which show approximately the position of the arms 75' and 79 etc. when bent back by a person that collides with them. In a similar manner would a pedestrian be moved out of the path of the vehicle who collides with the arms 75 and 78 etc. of the same vehicle or when the nose 145 evades to the right instead of to the left. The front part or nose 145 may be rigidly secured to the frame 146 whereby the flexibility of that nose will act to divert a person colliding therewith either to the right or to the left. However, this foremost part 145 may be made still more sensitive or mobile by mounting it on a pivot 150 which is secured by one or several arms 151 to the frame 146 and the rearward part of the nose 145 will be formed by two rubber shanks 152, 153 which engage the front part of the frame 146 which forms a rounded wall 154. When a collision occurs, the nose 145 will not only bend to the side that offers the least resistance but will partly revolve on the pivot 150 whereby the shank 152 or 153 will be pressed against the wall 154 and will be bent. The tendency of the rubber to straighten that shank 152 or 153 out straightens the whole part 145 out again and moves it to the position shown with the full lines. The shanks 152, 153 may be so far extended towards the sides of the vehicle that they will replace the arms 75, 75' etc.

What I claim is:

1. In safety devices for motor vehicles, a recoilable front bumper and a rear bumper, both bumpers having connections with a shaft bearing braking means and adapted to apply these braking means to the tires of the rear vehicle wheels when the one or the other of said bumpers will be pressed towards the vehicle.

2. In safety devices for motor vehicles adapted to protect the occupants of the motor vehicle, the vehicle itself and the pedestrian that should happen to be in the path of that vehicle, these safety devices comprising a recoilable front bumper, a horizontally held means in connection with said front bumper permitting a person struck by said front bumper to fall and to sit or to lie upon it without getting hurt, sausage shaped, resilient arms with soft outer hulls laterally extending from said vehicle in various heights, held only on one of their ends and bendable in such a degree as to be adapted to shove a person out of the path of the vehicle without hurting said person through the impact should that person not be in such position as to fall upon said means when colliding with the vehicle.

3. In safety devices for motor vehicles adapted to protect the occupants of the motor vehicle, the vehicle itself and the pedestrian that should happen to be in the path of the vehicle, said safety devices including a recoilable front bumper with horizontally held means that permit a person to fall upon it and sit or lie thereon without getting hurt, soft, rounded and resilient arms held only on one of their ends, being bendable in such degree and arranged at such height as to be adapted to shove off persons being in the path of the vehicle but not near enough to the center line thereof without injuring such person through the impact, and means automatically stopping said vehicle when a person falls upon said means or when a person is shoved out of the path of the vehicle by said arms.

4. In safety devices for motor vehicles, a front bumper adapted to recoil considerably without being limited by springs, rods for holding said bumper in front of the vehicle and having means for detaching said front bumper from said rods, attachable rods for elongating the said first named rods and being insertable between the front bumper and said first named rods, and having means for being quickly affixed to said first named rods and to said front bumper.

5. In safety devices for motor vehicles, a front bumper adapted to recoil, a means in connection with said front bumper permitting a person struck by said front bumper to fall upon it without getting hurt, laterally arranged arms adapted to shove a person off the path of the vehicle and means recording the falling of a person upon said first named means and when a person is shoved out of the path of the vehicle by said arms.

6. In safety devices for motor vehicles, a front bumper adapted to recoil, and side fenders on the vehicle, means recording the collisions made by said front bumper, said side fenders united by crossbars and a recording means connected with one of said crossbars and thereby adapted to record collisions with said side fenders that are directed from the side, from the front and from the rear of said side fenders said last mentioned recording device showing also the direction from which such collision occurs.

7. In safety devices for motor vehicles, a front bumper with means permitting a person to fall upon it when said front bumper strikes that person, arms arranged for shoving a person out of the path of the vehicle, interlocking means holding said front bumper and said arms in the position in which they have been moved by the weight and impact of said persons, an electric circuit including contacts and the sparkplugs in the motor of the vehicle, said contacts so arranged as to become disconnected when a person falls upon said first named means, and other contacts that are included in said electric circuit also becoming disconnected when a person will be shoved out of the path by said arms, all said contacts thereby adapted to open said circuit when thus disconnected.

8. In safety devices for motor vehicles, a front bumper and side fenders associated with rearwardly movable devices that are not limited in their movement by springs and springy means, and which permit recoiling of said front bumper a considerable distance farther than springs would permit and allowing the recoiling of said side fenders also a relatively long stretch, and means unassisted by springs adapted for automatically restoring said front bumper and side fenders to normal position.

9. In safety devices for motor vehicles, a front bumper associated with devices that permit recoiling of said front bumper when colliding with an obstacle, and having connections with the rear wheels of the vehicle, and means included in these connections for contacting with said rear wheels and thereby automatically advancing said front bumper to normal position when the vehicle moves forward again.

10. In safety devices for motor vehicles, a recoilable front bumper and recoilable and also side-wise movable side fenders associated with devices that are not limited in their rearward movement by springy means, said side fenders each constituted by a sheet of suitable material that is so extended, also over the top of the wheel, as to protect all the parts of the respective front wheel, that are exposed to side, front and rear collisions.

11. In safety devices for motor vehicles, a front bumper associated with means that permit recoiling of said bumper without the resistance of springs and the advancing of said bumper without the aid of springs and springy parts, and side fenders, not being secured to said front bumper nor to said means but having devices for centering them in relation to the front wheels of the vehicle and said means having abutments that permit said side fenders to move said means backward when they themselves are moved backwards.

12. In safety devices for motor vehicles, a front bumper and side fenders associated with devices that permit recoiling of said front bumper and side fenders with some resistance and permitting also the automatic advancing of said front bumper and side fenders without the assistance of springs, said devices comprising a flexible means that is wound upon a drum which is mounted on a shaft behind the rear vehicle wheels, said shaft held in bearings of movable hangers and carrying rollers so arranged as to press upon said rear wheels when said flexible means is pulled at the occurrence of a collision either of said front bumper or of said side fenders, causing a braking action upon said rear wheels, and an adjustable braking means in connection with said shaft adapted to prevent a too easy turning of the latter for permitting the pulling of said rollers against the rear wheels of the vehicle so that these wheels when turning in the direction for the forward moving of the vehicle will turn said rollers in the direction in which said flexible means will be wound up again on said drum and thus advance said front bumper and side fenders, and a latching device adapted for automatically securely holding said shaft to thereby cause said rollers to press uniformly upon said rear wheels, said latching device having means for automatically releasing said shaft and consequently also said rollers to normal position when said bumper will be restored to normal position.

13. In safety devices for motor vehicles, a recoilable front bumper and side fenders associated therewith, an extension for said front bumper arranged underneath the vehicle body, and in part formed as a rack whose teeth mesh with those of a cogwheel that is mounted on the armature shaft of an electric motor that is properly secured to some stable part of the vehicle, said rack having an electrical contact part adjoining at one of its ends an insulation, and two contacts of an electric circuit one normally contacting with said electrical contact part and the other normally contacting with said insulation, said last mentioned other contact coming into electrical contact with said electrical contact part on said rack when said front bumper, and the side fenders, respectively, and therefore said rack is moved backwards, thus closing a circuit comprising a source of electric energy, said electric motor being so arranged that while energized to drive said rack and consequently said front bumper and side fenders forward it is also equivalent to imposing a certain amount of resistance while said rack is being pushed backwards at the occurrence of a collision.

14. In safety devices for motor vehicles, a recoilable front bumper and side fenders on the vehicle, including vertically erected rods insertable in seats provided for on said front bumper and side fenders, sausage shaped resilient arms with outer envelopes of non-metallic, relatively soft material, removably held only at one of their ends by said rods and in such relation to the vehicle that the free ends of said arms project laterally past the limit of the path of the vehicle and being adapted to resiliently oppose a person which they might strike and thereby shove said person out of the vehicle path while the vehicle advances.

15. In safety devices for motor vehicles, a recoilable front bumper and side fenders associated with but not secured thereto and co-acting with said front bumper in the recoiling motion, extensions in form of rods and bars of both the front bumper and of the side fenders reaching underneath the vehicle body and associated with means that are adapted without the aid of springs for automatically moving said extensions together with said recoilable front bumper and side fenders into their normal positions after a collision has occurred with either of them.

16. In safety devices for motor vehicles, a front bumper associated with parts including rods and a revolvable member, the latter engageable and thereby rotatable with one of the rear wheels of the vehicle, said revolvable member adapted to revolve in one of the two directions when said front bumper is pushed backward and to revolve in the opposite direction thereby advancing said front bumper when engaging said wheel as the latter rotates in the direction in which the vehicle moves forward, said revolvable member counteracting the rearward movement of said bumper in such degree through automatic braking action exerted by said means when engaging said rear wheel, that no complete resistance is offered to an obstacle in the path of the vehicle and thus allowing a relatively smooth stopping of the vehicle unassisted and not counteracted by springs.

HEINRICH KARL.